US006834299B1

(12) United States Patent
Hamilton, II et al.

(10) Patent No.: US 6,834,299 B1
(45) Date of Patent: Dec. 21, 2004

(54) METHOD AND SYSTEM FOR AUTOMATING THE CONFIGURATION OF A STORAGE AREA NETWORK

(75) Inventors: Rick Allen Hamilton, II, Charlottesville, VA (US); Steven Jay Lipton, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 09/687,114

(22) Filed: Oct. 12, 2000

(51) Int. Cl.$^7$ .......................................... G06F 15/177
(52) U.S. Cl. ...................... 709/220; 709/200; 709/224; 709/246; 710/105; 710/200; 711/152; 711/207; 707/200; 713/100; 713/201; 370/411
(58) Field of Search ................................ 709/200, 220, 709/224, 246; 707/200; 710/1, 8, 105, 200; 711/152, 207; 370/411; 713/100, 201

(56) References Cited

U.S. PATENT DOCUMENTS

| | | | | |
|---|---|---|---|---|
| 5,524,253 | A | | 6/1996 | Pham et al. ................ 395/800 |
| 5,838,907 | A | | 11/1998 | Hansen ..................... 395/200.5 |
| 5,930,823 | A | * | 7/1999 | Ito et al. ...................... 711/152 |
| 6,021,436 | A | * | 2/2000 | Garrett ........................ 709/224 |
| 6,029,196 | A | | 2/2000 | Lenz ........................... 709/221 |
| 6,421,723 | B1 | * | 7/2002 | Tawil .......................... 709/224 |
| 6,446,141 | B1 | * | 9/2002 | Nolan et al. ................... 710/8 |
| 6,480,901 | B1 | * | 11/2002 | Weber et al. ............... 709/246 |
| 6,480,955 | B1 | * | 11/2002 | DeKoning et al. .......... 713/100 |
| 6,564,228 | B1 | * | 5/2003 | O'Connor ................... 707/200 |
| 6,640,278 | B1 | * | 10/2003 | Nolan et al. .................. 711/6 |
| 6,708,265 | B1 | * | 3/2004 | Black .......................... 711/207 |
| 2002/0124124 | A1 | * | 9/2002 | Matsumoto et al. ........ 710/105 |
| 2003/0028695 | A1 | * | 2/2003 | Burns et al. ................ 710/200 |
| 2003/0046583 | A1 | * | 3/2003 | Goldman et al. ........... 713/201 |
| 2003/0126315 | A1 | * | 7/2003 | Tan et al. ....................... 710/1 |
| 2003/0133464 | A1 | * | 7/2003 | Marejka et al. ............. 370/411 |

OTHER PUBLICATIONS

Exabyte Corp., "Storage Area Networkin (SAN)", 1999, Exabyte, 6 pages. Dave Rollings, "SANPower Teh Certified Solution", Seagate Technology, Bell MicroProducts, 1999, 8 pages.*
Connex, "Effective NAS–to–SAN Migration and Integration Techniques", Connex 2000, 5 pages. Jerry Namery, "Building a SAN to service two worlds", Jupitermedia orp., Apr. 28, 2000, 4 pages.*
Ron Levine, "Fibre Chennel vs. SCSI: Which is more advantageous for your storage area network?", SunWorld, Mar. 1999.*
Compaq Computer Corp., "Compaq SANworks Enterprise Netwrok Storage Management", COMPAQ White Paper, Dec. 2000, 7 pages.*

* cited by examiner

Primary Examiner—Jack B. Harvey
Assistant Examiner—Hai V. Nguyen
(74) Attorney, Agent, or Firm—Duke W. Yee; David A. Mims, Jr.; Stephen J. Walder, Jr.

(57) ABSTRACT

A method and system are provided for the development and maintenance of a single configuration file for a storage area network combined with an "intelligent" script which places server configuration files into the appropriate directories for servers which are part of the storage area network. On a server by server basis, each server is configured in accordance with the particular operating system the server itself is using. Once this is accomplished, each server added or removed from the storage area network will be processed in a similar way without the need for reconfiguration of the storage area network as a whole.

30 Claims, 8 Drawing Sheets

FIG. 7A

```
# san_configurator.ksh

# Written by Steve Lipton, with inputs from Rick Hamilton
# April 2, 2000

# Purpose: This script will install the SAN LUN configuration files on each server attaching to the fibre switch.
#          It is intended to simplify the administrator's task by automating the configuration of server-to-disk relationships.

# Input: 1) Input to this script is the name of the "Serving" system, on which the install code is located.
#           This "server" could be any system in the network that has "rcp" and "rsh" capabilities with
#           the respective workstations that will be identified as clients.
#        2) A list containing the ip addresses and the type of the operating system for the workstations
#           on which the client configurator file is to be installed.

# Copyright 2000, IBM Corporation. All rights reserved.

# First, create a list of the workstations who will be receiving the configuration
# files. This is provided by user entry of a filename to accomplish this.

if [ [ $# = 0 ] ] then
    clear
    print "Please enter the name of the list containing the ip addresses of"
    print "the workstations that are to receive the configuration files"
    print
    read wslist
else
    wslist=$1
fi
```

700 (braces upper block)
702 (braces lower block)

FIG. 7B

```
##########################################################################
# method for installing configuration files for a Solaris system
# sd.conf contains the entries describing the LUN's that each HBA on each server has access to
# st.conf contains the entries describing the tape devices that each HBA on each server has access to
##########################################################################
exec 3<wslist
while read -u3 ipaddr ostype
do                                                                        ⎫
                                                                          ⎬ 704
if $ostype == Solaris                                                     ⎭
    then
        if [ [ -a /usr/sys/inst.images/sol_sd.conf ] ] then
            rcp -p /usr/sys/inst.images/sd.conf $ipaddr:/kernel/drv/sd.conf    # Solaris directory
            if [ [ $? = 0 ] ] then
                echo "Successfully copied SAN configuration file sd.conf to $ipaddr" >>/SAN.copy.config.file.log
                echo "Successfully copied SAN configuration file sd.conf to $ipaddr"     ⎫
            else                                                                          ⎬ 706
                print "Unable to copy SAN config1 file sd.conf to $ipaddr"                ⎭
            fi
        fi if [ [ -a /usr/sys/inst.images/sol_st.conf ] ] then
            rcp -p /usr/sys/inst.images/st.conf $ipaddr:/kernel/drv/st.conf # Solaris directory
            if [ [ $? = 0 ] ] then
                echo "Successfully copied SAN configuration file st.conf to $ipaddr" >>/SAN.copy.config.file.log
                echo "Successfully copied SAN configuration file st.conf to $ipaddr"     ⎫
            else                                                                          ⎬ 708
                print "Unable to copy SAN config1 file st.conf to $ipaddr"                ⎭
            fi
        fi
```

FIG. 7C

```
else
  if $ostype == AIX
    then
      if [ [ -a /usr/sys/inst.images/aix-sd.conf ] ] then
        rcp -p /usr/sys/inst.images/sd.conf $ipaddr:/kernel/drv/sd.conf    # AIX directory
        if [ [ $? = 0 ] ] then
          echo "Successfully copied SAN configuration file sd.conf to $ipaddr" >>/SAN.copy.config.file.log
          echo "Successfully copied SAN configuration file sd.conf to $ipaddr"
        else
          print "Unable to copy SAN config1 file sd.conf to $ipaddr"
        fi
      fi
      if [ [ -a /usr/sys/inst.images/aix_st.conf ] ] then
        rcp -p /usr/sys/inst.images/st.conf $ipaddr:/kernel/drv/st.conf    #AIX directory
        if [ [ $? = 0 ] ] then
          echo "Successfully copied SAN configuration file st.conf to $ipaddr" >>/SAN.copy.config.file.log
          echo "Successfully copied SAN configuration file st.conf to $ipaddr"
        else
          print "Unable to copy SAN config1 file st.conf to $ipaddr"
        fi
      fi
```

```
    else
        if $ostype == Nt
        then
            if [ [ -a /usr/sys/inst.images/nt_sd.conf ] ] then
                rcp -p /usr/sys/inst.images/sd.conf $ipaddr:/kernel/drv/sd.conf     # Windows NT directory
                if [ [ $? = 0 ] ] then
                    echo "Successfully copied SAN configuration file sd.conf to $ipaddr" >>/SAN.copy.config.file.log
                    echo "Successfully copied SAN configuration file sd.conf to $ipaddr"
                else
                    print "Unable to copy SAN config1 file sd.conf to $ipaddr"
                fi
            fi
            if [ [ -a /usr/sys/inst.images/nt_st.conf ] ] then
                rcp -p /usr/sys/inst.images/st.conf $ipaddr:/kernel/drv/st.conf    #Windows NT directory
                if [ [ $? = 0 ] ] then
                    echo "Successfully copied SAN configuration file st.conf to $ipaddr" >>/SAN.copy.config.file.log
                    echo "Successfully copied SAN configuration file st.conf to $ipaddr"
                else
                    print "Unable to copy SAN config1 file st.conf to $ipaddr"
                fi
            fi                                                                                                        } 712
        else
            echo "$ostype not a currently supported operating system. "
            echo "Modify script to specify directory and filenames and try again!"   } 714
        fi
    done
```

METHOD AND SYSTEM FOR AUTOMATING THE CONFIGURATION OF A STORAGE AREA NETWORK

BACKGROUND OF THE INVENTION

1. Technical Field

The present invention relates generally to an improved distributed storage system and in particular to a method and a system for configuring a storage area network. Still more particularly, the present invention provides a method and a system for automating the configuration of a storage area network.

2. Description of the Related Art

The primary model of computing has been the mainframe computer with satellite terminals, but this model is being replaced with a client-server model of computing. The client-server model is distributed and may involve a plurality of servers and a plurality of clients, each a powerful workstation in its own right.

Early client-server models inherited from the mainframe model the concept of dedicated storage for each server. There are several major problems associated with using dedicated storage in this environment. Every time a client or a server needs to access information that is not available locally, the computer must issue a request for data to a peer machine. It takes time to process these requests and, if there is a heavy volume of non-local access, a bottleneck may result. In addition, one or more servers may have requirements for data storage that exceed their capacities while other servers may only be using a fraction of their available data storage.

A Storage Area Network (SAN) is a relatively new innovation for the client-server model based on a data-centric infrastructure with a common storage pool. A SAN works well provided there are persistent communications links. Distributed networks, such as the Internet, are constructed with persistence in mind. In other words, the loss of one or several communications links will not shut down the network and an alternative path through the network can almost always be found.

One or more configuration files describing the details of the SAN need to be maintained at each server in the network. A network may contain tens or hundreds of servers and servers may be added or removed on a continual basis. Each configuration file on every server connected to the network must be changed as the machines on the SAN change. It is far too tedious and error prone to manually perform reconfiguration on a server-by-server basis. A SAN may include a variety of operating systems, such as, for example, Solaris™, a version of UNIX used by computers from Sun Microsystems, AIX™, a version of UNIX used by computers from International Business Machines, and Windows NT™, an operating system from Microsoft that is used by a variety of workstations. Transferring data between different operating systems must be done very carefully since the file system formats are not compatible. Transferring data in the wrong format could result in loss of the data and damage to the file system. It only takes a single incorrect entry of the operating system type to cause this problem to occur. If data is being entered and maintained manually on a server that is part of the SAN, this type of error is very probable. Therefore, it would be advantageous to have a master configuration file to represent the complete configuration of the SAN whereby changes to the one master file would be reflected uniformly everywhere on the SAN.

SUMMARY OF THE INVENTION

The present invention provides a method and system for the development and maintenance of a single configuration file for a storage area network combined with an "intelligent" script which places server configuration files into the appropriate directories for servers that are part of a storage area network. On a server by server basis, each server is configured in accordance with the particular operating system the server itself is using. Once this is accomplished, each server added or removed from the storage area network will be processed in a similar way without the need for reconfiguration of the storage area network as a whole.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A–7D is an exemplary shell script for updating configuration files in accordance with a preferred embodiment of the invention.

DETAILED DESCRIPTION OF THE PREFERRED EMBODIMENT

Figure 1:
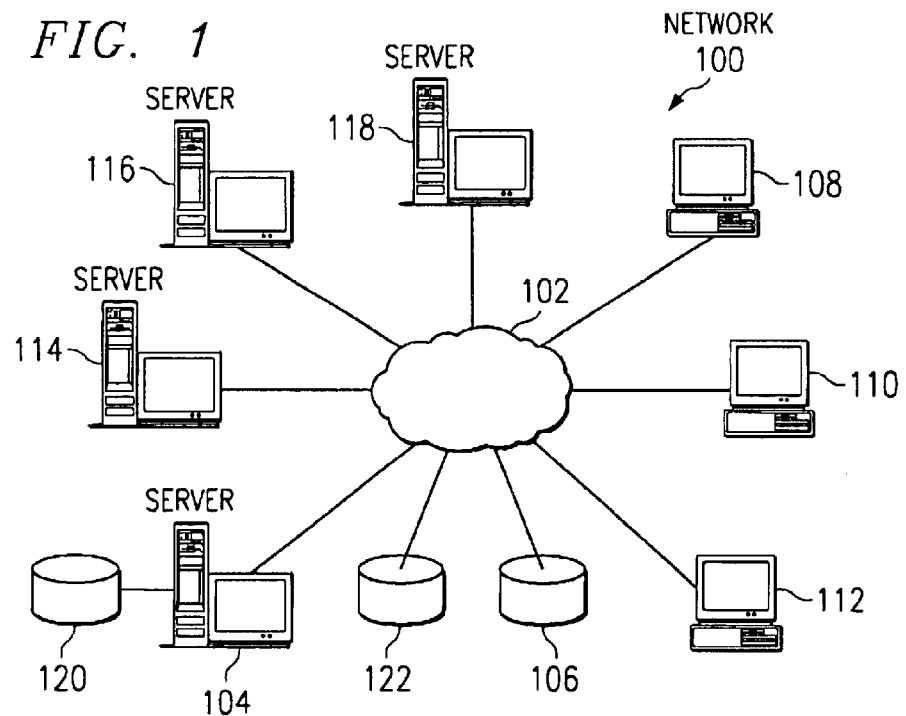
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 120 provides dedicated backup support for server 104. In addition, clients 108, 110 and 112 are also connected to network 102. These three clients may be, for example, personal computers or network computers.

For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data ad backup allocation is set, and data backup transfer occurs at low usage times, typically after midnight, between any of servers 104, 114, 116 and 118 and storage units 106 and 122.

Prior to the development of Storage Area Networks, each server managed dedicated disk storage, such as Server 104 with disk storage 120. With the advent of a SAN, all disks, such as disks 106, 120, and 122, form a common storage area. When server computers, such as Servers 104, 114, 116, and 118, are added or removed from the SAN, configuration files on each machine that is part of the SAN have to be updated accordingly.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention. For example, network 102 may use other hardware devices, such as, plotters, optical scanners, and the like in addition or in place of the hardware depicted in FIG. 1.

Figure 2:
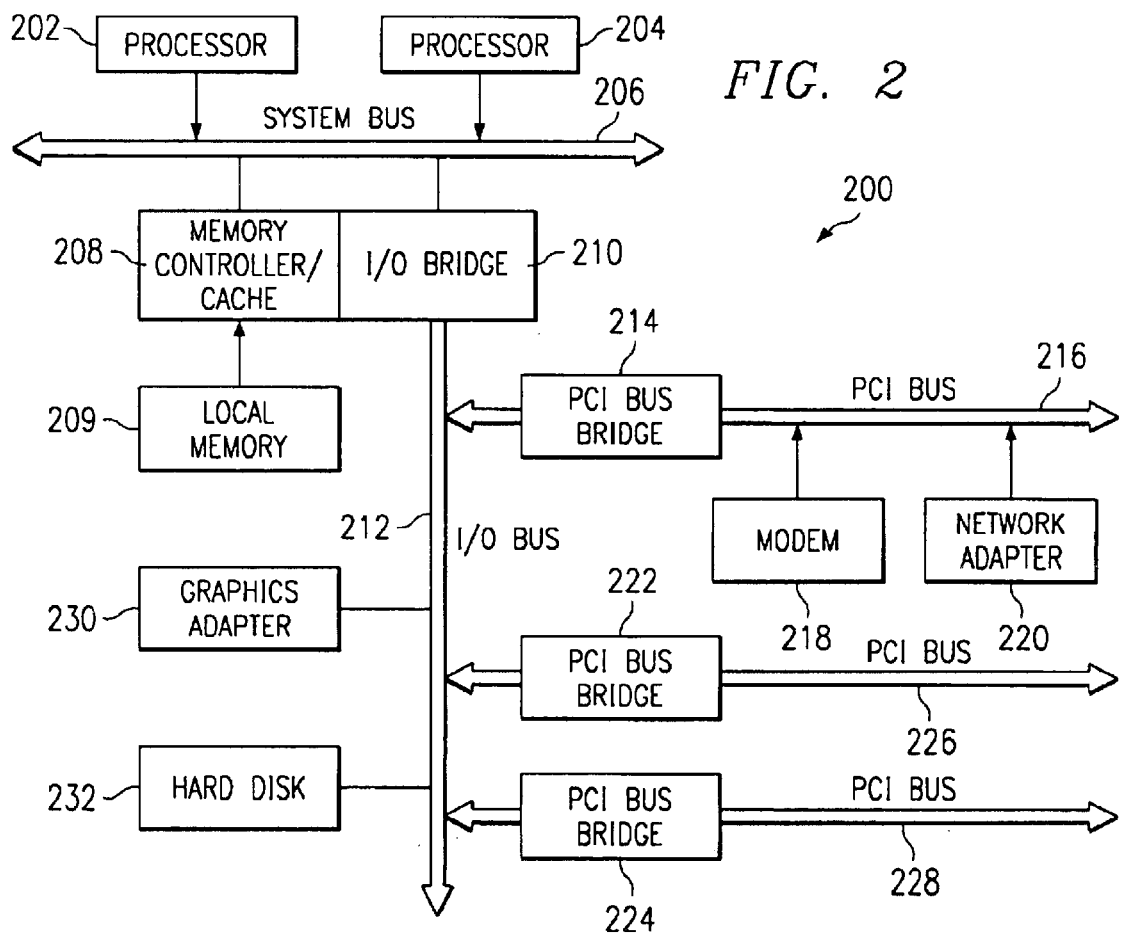
FIG. 2 is a block diagram illustrating a data processing system that may be implemented as a server in which the present invention may be implemented.

FIG. 2 is a block diagram illustrating a data processing system that may be implemented as a server in which the present invention may be implemented. The server in FIG. 2 may be server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system. AIX is one of the operating systems supported by the current invention. Other supported operating systems are Solaris from Sun Microsystems and Windows NT from Microsoft.

Figure 3:
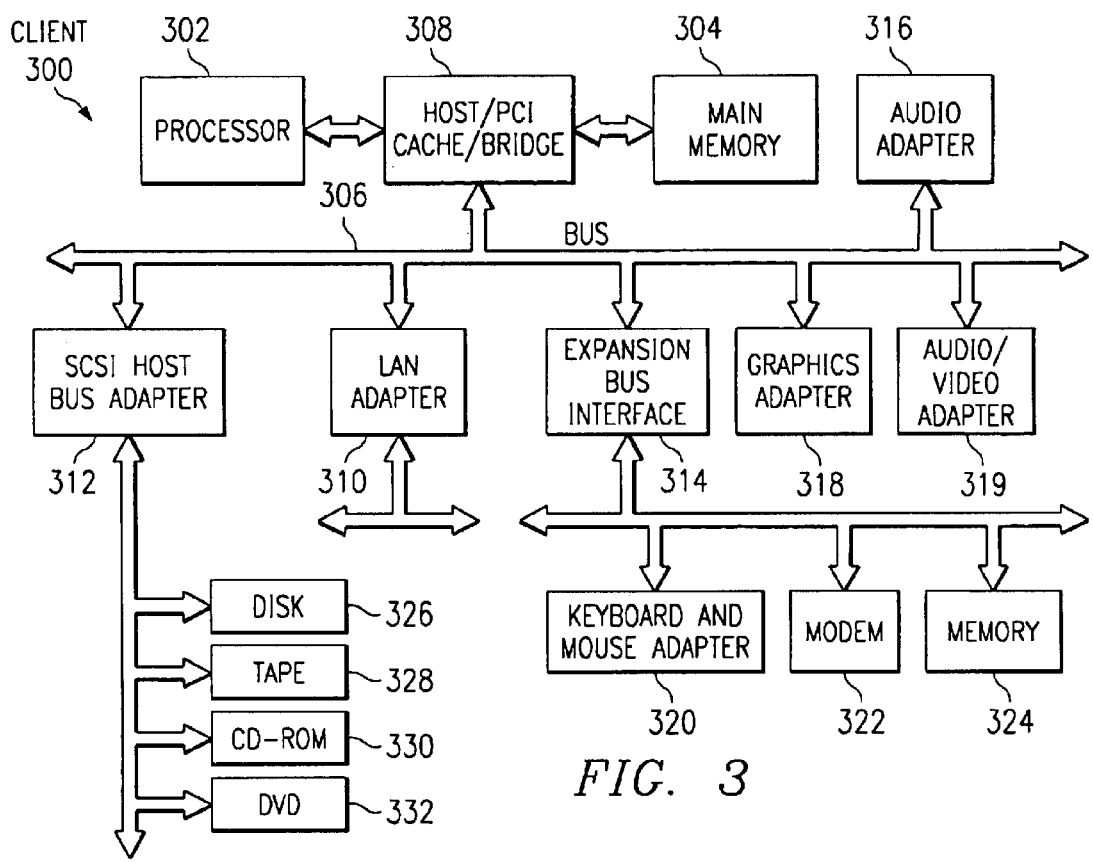
FIG. 3 is a block diagram illustrating a data processing system that may be implemented as a client in which the present invention may be implemented.

FIG. 3 is a block diagram illustrating a data processing system that may be implemented as a client in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention.

In a preferred embodiment, the present invention controls the task of configuring computing resources connected to a SAN with the use of operating systems, such as, for example, Solaris™, AIX™, and Windows NT™. However, the present invention is not limited to these particular operating system environments and may be implemented with other operating systems as well.

In one embodiment of the present invention, the process involves the development and upkeep of a single configuration file, which may be combined with an "intelligent" script, which places configuration files into the appropriate directories on each SAN attached machine. Within the SAN environment, key configuration files must be stored on each server, such as, for example, server 200 in FIG. 2, attached to a network, such as, for example, network 100 in FIG. 1. The purpose of these configuration files is to define, for each computational resource, the storage locations which each computational resource may be authorized to use from a storage pool. After these storage locations are identified, all other non-defined locations are invisible to that particular computational resource.

A server may connect to a SAN Fibre Channel by way of a special adapter called the Host Bus Adapter (HBA).

Each HBA may have a unique identifier called the World Wide Name (WWN), similar to the way each ethernet card or each token-ring card may have an individualized address.

In addition to a switch connection through the HBA, there is a configuration file, such as, for example, a sd.conf file or a st.conf file, which may specify which disk locations or tape locations the server may access. Each server connecting to the SAN must have such a file. A system administrator may choose to create a unique file for each server which may contain only the entries for that server, or the system administrator may create one master file which contains all entries for all servers. Since each HBA has a unique identifier, there is no possibility of confusing one HBA for another. Furthermore, by having one master configuration file, the system administrator is providing a form of documentation for the entire SAN environment which will help prevent the system administrator from mistakenly assigning one operating system file to a server designed for a second different operating system.

Therefore, the present invention provides a method and system for simplifying and automating the administration of such SANs. Although the current invention normally affects only server machines, if any client machines, such as, for example, client 300 in FIG. 3, that are also part of the SAN, the client configuration files may also have to be updated when the SAN for the server the clients are connected to is changed in any way. Once a SAN is to be configured using the appropriate configuration file, and once the configuration file name is identified, the present invention takes over the process and automatically configures the server and each client connected to the SAN with the appropriate operating system. The operating system used by the server connected to the SAN is determined. Available operating systems may be, for example, Solaris™, AIX™, Windows NT™, and the like. Then the server is automatically configured based on the operating system of the server. If it is determined that the server's operating system is not supported by the SAN, an error message may be displayed which indicates that the operating system is not recognized.

Figure 4:
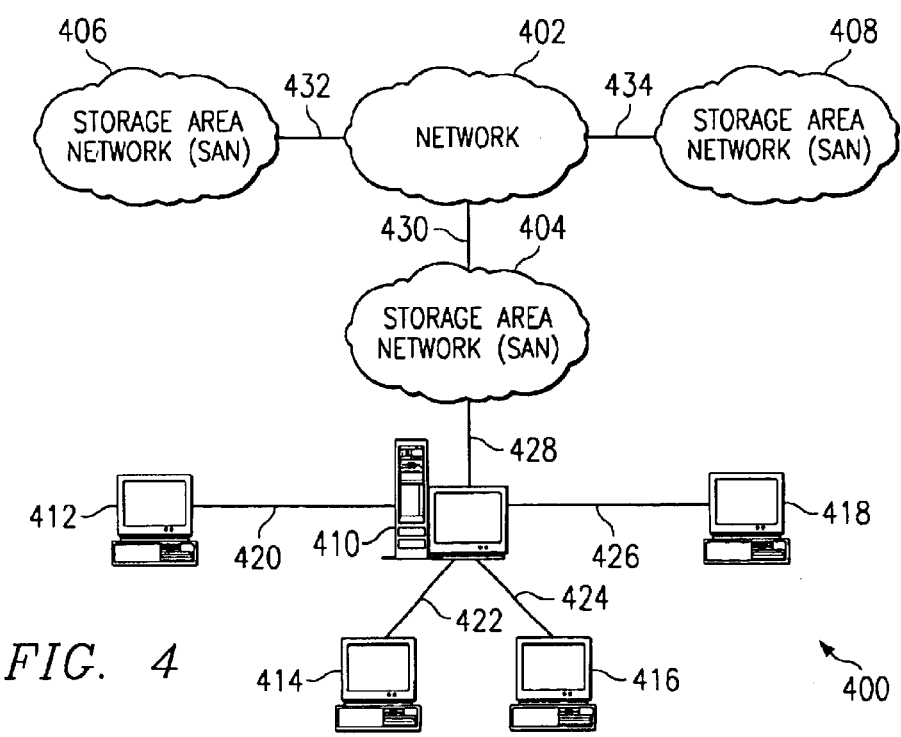
FIG. 4 is an exemplary illustration of a network containing a storage area network (SAN) in accordance with a preferred embodiment of the present invention.

FIG. 4 is an exemplary illustration of a network containing a storage area network (SAN) in accordance with a preferred embodiment of the present invention. In a preferred embodiment of the present invention, the SAN is made up of one server, although a plurality of servers may be connected to the SAN, in an alternate embodiment, without departing from the spirit and the scope of the present invention.

In this example, network 402 may be made up of lei several SANs, such as, for example, SAN 404, SAN 406, and FL SAN 408. Each SAN contained within network 402 is connected to the network via connections, 430, 432, and 434, respectively. Contained within each SAN is a server, such as, for example, server 410 connected to SAN 404 via connection 428. Each server may also contain a ell number of client computers, such as, for example, clients 412, 414, 416 and 418 connected to server 410. Each client is connected to server via connections, 420, 422, 424 and 426, respectively.

Figure 5:
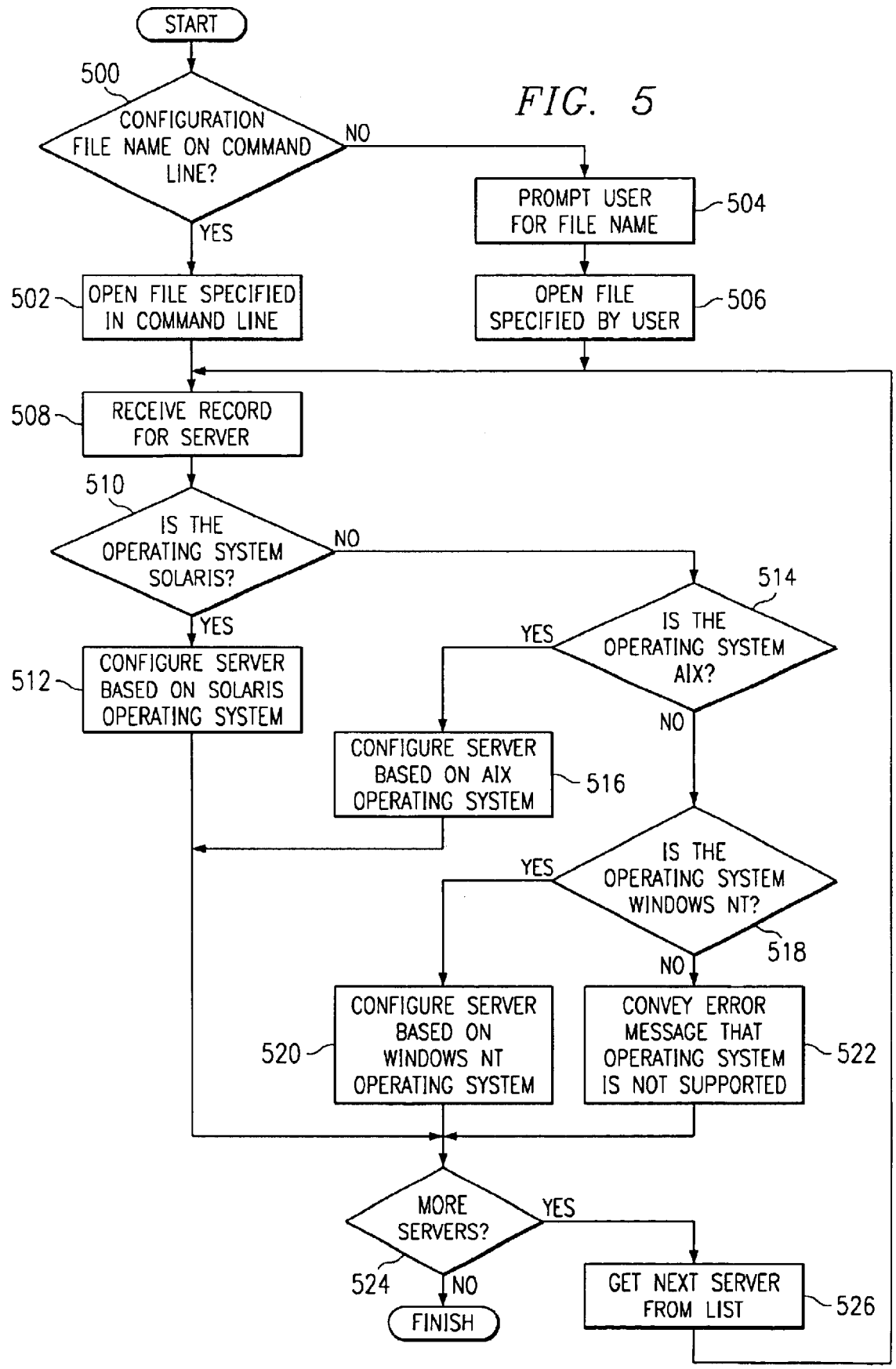
FIG. 5 is a flowchart illustrating the automatic configuration of a server within each SAN in accordance with a preferred embodiment of the invention.

FIG. 5 is a flowchart illustrating the automatic configuration of a server within each SAN in accordance with a preferred embodiment of the invention. In this example, the operation begins by opening the file containing information about all members of the SAN. The file containing information about all members of the SAN may be located in the same directory where the SAN configuration files are located. The file containing information about all members of the SAN may contain one record for each server that is to receive the configuration file(s). Each record in the file may contain two items: the server Internet Protocol (IP) address and the server operating system.

In this example, opening the file may either be done by including the file name on the command line or by interacting with the user. A determination is made as to whether or nor the configuration file name for the server is given on the file command line (step 500). If the configuration file name for the server is given on the file command line (step 500:YES), then the specified file is opened for processing (step 502). If no file name is given on the file command line (step 500:NO), then the user is prompted to enter a file name (step 504) and the named configuration file is opened (step 506). A record for a server is then received (step 508).

A determination is then made as to whether or not the server operating system is Solaris (step 510). If the operating system is Solaris (step 510:YES), then the Adz server configuration is performed based on Solaris (step 512). If the operating system is not Solaris (step 510:NO), then there is a determination as to whether or not the server operating system is AIX (step 514). If the operating system is AIX (step 514:YES), then the server configuration is performed based on AIX (step 516). If the operating system is not AIX (step 514:NO), then there is a determination as to whether or not the server operating system is Windows NT (step 518). If the operating system is not Windows NT (step 518:NO), then an error message may be conveyed indicating the operating system is not supported (step 522). This message may be printed or displayed. If the operating system is Windows NT (step 518:YES), then the server is reconfigured based on Windows NT (step 520).

Once processing the current server is finished, a determination is made as to whether or not there is another server available for processing (step 524). If it is determined that there is not another server available for processing (step 524:NO), then the operation terminates. If it is determined that there is another server available for processing (step 524:YES), the operation returns to step 508 to receive the next record for the next server until all servers are processed. Although the exact commands to carry out the configuration vary slightly based on the operating system, the logical steps in the operation may be the same.

Figure 6:
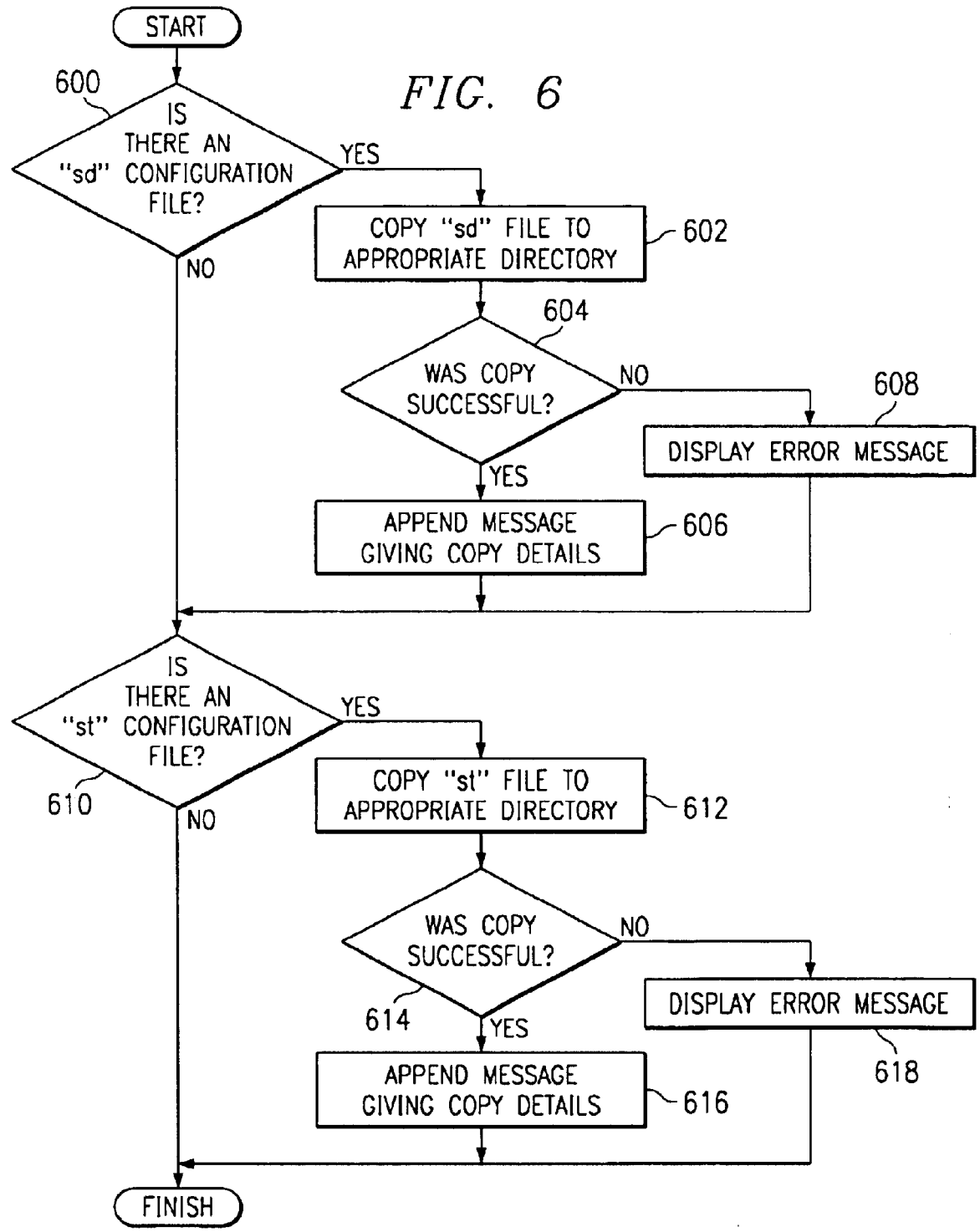
FIG. 6 is a flowchart illustrating the transfer of configuration files for an individual server within a SAN in accordance with a preferred embodiment of the invention.

FIG. 6 is a flowchart illustrating the transfer of configuration files for an individual server within a SAN in accordance with a preferred embodiment of the invention. There may be two types of files, such as, for example, an "sd" type configuration file for the assignment of disk storage space to a participating server and an "st" type configuration file assigning tape drive storage access to a participating server.

In this example, the operation begins by determining as to whether or not there is a "sd" type configuration file (step 600). If it is determined that there is not a "sd" type configuration file available for copying (step 600:NO), then a determination is made as to whether or not there is a "st" type configuration file available for copying (step 610). If it is determined that there is a "sd" type configuration file available for copying (step 600:YES), then the copy command understood by the operating system is issued to copy the "sd" type configuration file to the appropriate directory (step 602). Then a determination is made as to whether or not the copying of the "sd" type configuration file was successful (step 604). If the copying of the "sd" type configuration file was successful (step 604:YES), then a message is output giving the details of the file copy results (step 606). The successful information message may be appended to the file /SAN.copy.config.file.log which is located on the server where this configuration program script resides. If the copying of the "sd" type configuration file fails for any reason (step 604:NO), an appropriate error message is displayed indicating the failure (step 608). The error message may be printed or visually displayed on a main console connected to the server.

Returning to step 610, whether a message is appended giving details of the "sd" type configuration file copy results or an error message is displayed indicating that the "sd" configuration file copy failed, then it is determined as to whether or not there is an "st" type configuration file available for copying (step 610). If it is determined that there is not a "st" type configuration file available for copying (step 610:NO), then the operation terminates. If it is determined that there is a "st" type configuration file to be copied (step 610:YES), then a copy command appropriate for the operating system is issued and the "st" type configuration file is copied (step 612). Then a determination is made as to whether or not the copying of the "st" type configuration file was successful (step 614). If the copying of the "st" type configuration file failed for any reason (step 614:NO), then an error message is displayed indicating the failure (step 618) and thereafter the operation terminates. The error message may be printed or visually displayed on a main console connected to the server. If the copying of the "st" type configuration file was successful (step 614:YES), then a message is output giving the details of the file copy results (step 616) and thereafter the operation terminates. The successful information message is appended to the file /SAN.copy.config.file.log which is located on the server where this configuration program script resides.

FIGS. 7A–7D is an exemplary shell script for updating configuration files in accordance with a preferred embodiment of the invention. In this example, At section 700 contains comments providing program documentation. Section 702 opens a file containing the list of servers either through a command line argument or through user interaction. This code corresponds to steps 500–508 in FIG. 5.

The program reads the next server to be processed in Section 704. This corresponds to step 510 in FIG. 5. The type of operating system used by the server is determined and the "sd" configuration file and "st" type configuration file are copied, as necessary. If the operating system is Solaris, then Section 706 copies the "sd" type configuration file. This corresponds to steps 600–608 in FIG. 6. If a "st" type configuration file has to be copied, this is done by the code in Section 708 corresponding to steps 610–618 in FIG. 6.

Other operating systems are handled in a similar manner. In this example, section 710 is for the AIX operating system and Section 712 is for the Windows NT operating system. As shown in Section 714, any unsupported operating system results in the display of an error message. After this is complete, control returns to Section 704 where the next server is processed. The entire operation halts when there are no more servers to be processed.

The operation describes a process for automatically updating all configuration files for a server in a Storage Area Network based on a single master file which makes it much easier to handle changes to a SAN in an efficient and error free manner. When a server is added or removed from the SAN, this change only needs to be entered once in the master configuration file. The script described in FIGS. 5–6 and the code given in FIG. 7 automatically propagates these changes throughout the SAN. Any discrepancies in carrying out these changes may be logged for review by a system administrator.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for configuring a storage area network, the method comprising the steps of:

collecting operating system data for a server, wherein the server is connected to a storage area network;

comparing operating system data for the server to operating system data of the storage area network to identify an operating system type of the server and to select a configuration file from a list of configuration files based on the operating system type, wherein the configuration file contains configuration information for the storage area network;

configuring an operating system of the server based on the operating system type and the configuration information in the selected configuration file, wherein the server operating system is automatically configured to allow the server to access the storage area network.

2. The method of claim 1, further comprising:
receiving a server configuration file identifier, wherein the server configuration file identifier corresponds to a server configuration file.

3. The method of claim 2, wherein the server configuration file comprises at least one record, wherein the record comprises at least one of an internet protocol address and an operating system type of a server.

4. The method of claim 2, wherein receiving the server configuration file identifier is at least one of reading the server configuration file identifier from the server configuration file and prompting for the server configuration file identifier.

5. The method of claim 1, wherein allowing the server to access the storage area network comprises allowing the server to access at least one of a disk storage device and a tape storage device within the storage area network.

6. The method of claim 1, wherein comparing operating system data for the server to operating system data of the storage area network identifies an operating system as being at least one of a Solaris™ operating system, an AIX™ operating system, and a Windows NT™ operating system.

7. The method of claim 1, further comprising:
appending an information message to a server configuration file, wherein the information message contains details of the server operating system configuration.

8. The method of claim 1, further comprising:
conveying an error message, wherein the error message indicates that the connected server operating system is not supported by the storage area network.

9. The method of claim 8, wherein conveying the error message is by at least one of printing the error message and visually displaying the error message.

10. The method of claim 1, further comprising:
configuring an operating system of a client, wherein the client is connected to the server to allow the client to access the storage area network.

11. A data processing system for configuring a storage area network, the data processing system comprising:
collecting weans for collecting operating system data for a server, wherein the server is connected to a storage area network;
comparing means for comparing operating system data for the server to operating system data of the storage area network to identify an operating system type of the server and to select a configuration file from a list of configuration files based on the operating system type, wherein the configuration file contains configuration information for the storage area network; and
configuring means for configuring an operating system of the server based on the operating system type and the configuration information in the selected configuration file, wherein the server operating system is automatically configured to allow the server to access the storage area network.

12. The system of claim 11, further comprising
receiving means for receiving a server configuration file identifier, wherein the server configuration file identifier corresponds to a server configuration file.

13. The system of claim 12, wherein the server configuration file comprises at least one record, wherein the record comprises at least one of an internet protocol address and an operating system type of a server.

14. The system of claim 12, wherein receiving the server configuration file identifier is at least one of reading the server configuration file identifier from the server configuration file and prompting for the server configuration file identifier.

15. The system of claim 11, wherein allowing the server to access the storage area network comprises allowing the server to access at least one of a disk storage device and a tape storage device within the storage area network.

16. The system of claim 11, wherein comparing operating system data for the server to operating system data of the storage area network identifies an operating system as being at least one of a Solaris™ operating system, an AIX™ operating system, and a Windows NT™ operating system.

17. The system of claim 11, further comprising:
appending means for appending an information message to a server configuration file, wherein the information message contains details of the server operating system configuration.

18. The system of claim 11, further comprising:
conveying means for conveying an error message, wherein the error message indicates that the connected server operating system is not supported by the storage area network.

19. The system of claim 18, wherein conveying the error message is by at least one of printing the error message and visually displaying the error message.

20. The system of claim 11, further comprising:
configuring means for configuring an operating system of a client, wherein the client is connected to the server to allow the client to access the storage area network.

21. A computer program product in computer readable medium for configuring a storage area network, the computer program product comprising:
first instructions for collecting operating system data for a server, wherein the By server is connected to a storage area network;
second instructions for comparing operating system data for the server to operating system data of the storage area network to identify an operating system type of the server and to select a configuration file from a list of configuration files based on the operating system type, wherein the configuration file contains configuration information for the storage area network; and
third instructions for configuring an operating system of the server based on the operating system type and the configuration information in the selected configuration file, wherein the server operating system is automatically configured to allow the server to access the storage area network.

22. The computer program product of claim 21, further comprising:
fourth instructions for receiving a server configuration file identifier, wherein the server configuration file identifier corresponds to a server configuration file.

23. The computer program product of claim 22, wherein the server configuration file comprises at least one record, wherein the record comprises at least one of an internet protocol address and an operating system type of a server.

24. The computer program product of claim 22, wherein receiving the server configuration file identifier is at least one of reading the server configuration file identifier from the server configuration file and prompting for the server configuration file identifier.

25. The computer program product of claim 21, wherein, allowing the server to access the storage area network comprises allowing the server to access at least one of a disk storage device and a tape storage device within the storage area network.

26. The computer program product of claim 21, wherein comparing operating system data for the server to operating system data of the storage area network identifies an operating system a being at least one of a Solaris™ operating system an AIX™ operating system, and a Windows NT™ operating system.

27. The computer program product of claim 21, further comprising:

fifth instructions for appending an information message to a configuration file, wherein the information message contains details of the server operating system configuration.

28. The computer program product of claim 21, further comprising:

sixth instructions for conveying an error message, wherein the error message indicates that the connected server operating system is not supported by the storage area network.

29. The computer program product of claim 28, wherein conveying the error message is by at least one of printing the error message and visually displaying the error message.

30. The computer program product of claim 21, further comprising:

seventh instructions for configuring an operating system of a client, wherein the client is connected to the server to allow the client to access the storage area network.

* * * * *

UNITED STATES PATENT AND TRADEMARK OFFICE
CERTIFICATE OF CORRECTION

PATENT NO.    : 6,834,299 B1
DATED         : December 21, 2004
INVENTOR(S)   : Hamilton, II et al.

It is certified that error appears in the above-identified patent and that said Letters Patent is hereby corrected as shown below:

Column 6,
Line 9, after "made up of", delete "lei".

Column 9,
Line 40, before "for collecting", delete "weans" and insert -- means --.

Column 10,
Line 31, after "wherein the", delete "By".

Column 11,
Line 2, after "system", delete "a" and insert -- as -- (1st occurrence).
Line 3, before "an AIX", insert -- , --.

Signed and Sealed this

Twenty-ninth Day of November, 2005

JON W. DUDAS
*Director of the United States Patent and Trademark Office*